United States Patent
Satake et al.

(10) Patent No.: US 10,889,684 B2
(45) Date of Patent: Jan. 12, 2021

(54) POLYESTER RESIN

(71) Applicant: MITSUBISHI GAS CHEMICAL COMPANY, INC., Tokyo (JP)

(72) Inventors: Yuichiro Satake, Kanagawa (JP); Yasuaki Yoshimura, Kanagawa (JP); Eiichi Honda, Kanagawa (JP); Takashi Motoi, Okayama (JP); Mitsuharu Kitamura, Niigata (JP)

(73) Assignee: MITSUBISHI GAS CHEMICAL COMPANY, INC, Tokyo (JP)

( * ) Notice: Subject to any disclaimer, the term of this patent is extended or adjusted under 35 U.S.C. 154(b) by 0 days.

(21) Appl. No.: 15/758,592

(22) PCT Filed: Sep. 12, 2016

(86) PCT No.: PCT/JP2016/076867
§ 371 (c)(1),
(2) Date: Mar. 8, 2018

(87) PCT Pub. No.: WO2017/047555
PCT Pub. Date: Mar. 23, 2017

(65) Prior Publication Data
US 2018/0305494 A1   Oct. 25, 2018

(30) Foreign Application Priority Data

Sep. 18, 2015 (JP) ................................ 2015-184687

(51) Int. Cl.
*C08G 63/199* (2006.01)
*C08G 63/183* (2006.01)
*C08G 63/189* (2006.01)
*G02B 1/04* (2006.01)

(52) U.S. Cl.
CPC ......... *C08G 63/199* (2013.01); *C08G 63/183* (2013.01); *C08G 63/189* (2013.01); *G02B 1/04* (2013.01)

(58) Field of Classification Search
CPC ...... G02B 1/04; C08G 63/183; C08G 63/189; C08G 63/199
See application file for complete search history.

(56) References Cited

U.S. PATENT DOCUMENTS

2005/0124779 A1   6/2005   Shelby et al.

FOREIGN PATENT DOCUMENTS

| JP | 04-338594 | 11/1992 |
| JP | 05-155964 | 6/1993 |
| JP | 07-070871 | 3/1995 |
| JP | 09-291138 | 11/1997 |
| JP | 2003-119259 | 4/2003 |
| JP | 2007-161917 | * 6/2007 |
| JP | 2007-517926 | 7/2007 |
| JP | 2007-238856 | 9/2007 |

OTHER PUBLICATIONS

Official Communication issued in International Bureau of WIPO Patent Application No. PCT/JP2016/076867, dated Nov. 15, 2016.

* cited by examiner

*Primary Examiner* — Ling Siu Choi
*Assistant Examiner* — Gennadiy Mesh
(74) *Attorney, Agent, or Firm* — Greenblum & Bernstein, P.L.C.

(57) ABSTRACT

A polyester resin having a diol constitutional unit and a dicarboxylic acid constitutional unit, wherein 20 to 100 mol % of the diol constitutional unit is a constitutional unit derived from a diol having a dinorbornane ring; a glass transition temperature of the polyester resin is 90° C. or higher; an amount of heat of a crystallization exothermic peak in temperature drop of the polyester resin is 5 J/g or less; and a yellow index (YI) value as measured by a reflection method according to JIS K 7103 is 10 or less.

5 Claims, No Drawings

POLYESTER RESIN

TECHNICAL FIELD

The present invention relates to a polyester resin and, specifically, relates to a polyester resin having a unit that is derived from a specific glycol having a dinorbornane ring skeleton.

BACKGROUND ART

Polyethylene terephthalate (hereinafter sometimes referred to as "PET") is a polyester resin that is characterized by excellent transparency, mechanical strength, melt stability, solvent resistance, aroma retaining properties, and recyclability, and is widely utilized in film, sheet, hollow containers, and the like. However, it cannot be said that PET has a sufficiently high glass transition temperature, also transparency may be impaired due to its crystallinity when a thick molded article is obtained, and therefore modification by copolymerization is widely carried out.

A polyester resin obtained by copolymerizing 1,4-cyclohexanedimethanol is proposed as a modification example of PET (see, for example, Patent Literature 1).

Also, since tricyclodecanedimethanol, pentacyclopentadecanedimethanol, and the like have bulky and rigid skeletons, it is expected that polyester resins involving these have high glass transition temperatures and suppressed crystallinity, and molded articles have increased transparency (see, for example, Patent Literatures 2 and 3).

CITATION LIST

Patent Literature

Patent Literature 1: Japanese Patent Laid-Open No. 2007-517926
Patent Literature 2: Japanese Patent Laid-Open No. 2007-238856
Patent Literature 3: Japanese Patent Laid-Open No. 2003-119259

SUMMARY OF INVENTION

Technical Problem

The polyester resin described in Patent Literature 1 has a glass transition temperature of around 80° C., and the heat resistance is not necessarily sufficient. The polyester resins described in Patent Literatures 2 and 3 are problematic in that coloration is intense and the hue is poor, in addition to that a further improvement of heat resistance is required.

The present invention has been conceived in view of the problems of the conventional art described above, and an object of the present invention is to provide a polyester resin having excellent transparency and heat resistance and having a good hue.

Solution to Problem

As a result of having conducted diligent research to solve the above problems, the present inventors have found that the above problems can be solved by a polyester resin obtained from a raw-material diol having a decahydro-1,4:5,8-dimethanonaphthalene ring skeleton (hereinafter sometimes referred to as a diol having a dinorbornane ring), and thus arrived at the present invention.

That is to say, the present invention relates to the following polyester resins.

[1]
A polyester resin mainly comprising a diol constitutional unit and a dicarboxylic acid constitutional unit, wherein
20 to 100 mol % of the diol constitutional unit is a constitutional unit derived from a diol having a dinorbornane ring represented by the following formula (i);
a glass transition temperature is 90° C. or higher;
an amount of heat of a crystallization exothermic peak in temperature drop is 5 J/g or less; and
a YI value as measured by a reflection method according to JIS K 7103 is 10 or less:

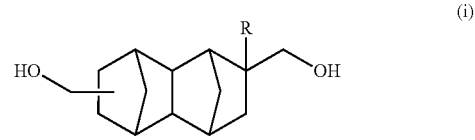

wherein R is H, $CH_3$, or $C_2H_5$.

[2]
The polyester resin according to [1], wherein the dicarboxylic acid constitutional unit is a constitutional unit derived from at least one selected from terephthalic acid, isophthalic acid, 2,6-naphthalenedicarboxylic acid, and 1,4-cyclohexanedicarboxylic acid.

[3]
The polyester resin according to [1] or [2], comprising a constitutional unit derived from 2,6-naphthalenedicarboxylic acid as the dicarboxylic acid constitutional unit, wherein the glass transition temperature is 130° C. or higher.

[4]
The polyester resin according to any one of [1] to [3], comprising a constitutional unit derived from ethylene glycol as a diol constitutional unit other than the diol having a dinorbornane ring represented by formula (i).

Advantageous Effects of Invention

The polyester resin of the present invention has excellent transparency and heat resistance and has a good resin hue.

DESCRIPTION OF EMBODIMENTS

Below, an embodiment for carrying out the present invention (hereinafter simply referred to as "the present embodiment") will now be described in detail. The following present embodiment is an example for describing the present invention and is not intended to limit the present invention to the following contents. The present invention can be carried out after suitably making modifications within the scope of the present invention.

The polyester resin of the present embodiment is a polyester resin mainly comprising a diol constitutional unit and a dicarboxylic acid constitutional unit, wherein 20 to 100 mol % of the diol constitutional unit is a constitutional unit derived from a diol having a dinorbornane ring represented by the following formula (i); a glass transition temperature is 90° C. or higher; an amount of heat of a crystallization exothermic peak in temperature drop is 5 J/g or less; and a YI value as measured by a reflection method according to JIS K 7103 is 10 or less.

Being configured in this way, the polyester resin of the present embodiment has excellent transparency and heat resistance and has a good resin hue. That is to say, the polyester resin of the present embodiment can be suitably utilized in films, fibers, resin-molded articles, and the like that are required to have heat resistance, transparency, and the like.

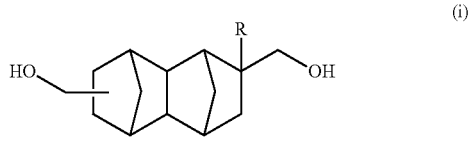

(i)

wherein R is H, CH$_3$, or C$_2$H$_5$, and is preferably H or CH$_3$.

The term "mainly" as used herein means that the total proportion of the diol constitutional unit and the dicarboxylic acid constitutional unit among all constitutional units of the polyester resin is 70 mol % or more. In the present embodiment, the total proportion is preferably 80 mol % or more, more preferably 90 mol % or more, and even more preferably 100 mol %.

In the diol constitutional unit contained in the polyester resin of the present embodiment, the proportion of a constitutional unit derived from a diol represented by the above formula (i) is 20 mol % or more and 100 mol % or less, preferably more than 20 mol % and 100 mol % or less, more preferably 21 mol % or more and 100 mol % or less, even more preferably 25 mol % or more and 100 mol % or less, and yet more preferably 30 mol % or more and 100 mol % or less, of the diol constitutional unit.

Due to the constitutional unit derived from a diol having a dinorbornane ring being contained in the above proportion in the diol constitutional unit, an increase of the glass transition temperature of the polyester resin of the present embodiment is achieved, and the polyester resin has increased heat resistance. In addition, crystallinity is reduced, and neither whitening nor embrittlement resulting from crystallization, when a thick molded article is formed, occurs. When the proportion of the constitutional unit derived from a diol having a dinorbornane ring is less than 20 mol % of the overall diol unit, the effect of increasing the glass transition temperature of the polyester resin is not sufficiently obtained and, also, the effect of reducing crystallinity is not always sufficiently obtained.

In the diol constitutional unit contained in the polyester resin of the present embodiment, a diol constitutional unit (a further diol constitutional unit) other than the constitutional unit derived from the diol having a dinorbornane ring is not particularly limited.

Examples of the further diol constitutional unit include, but are not limited to, constitutional units derived from aliphatic diols, diols having alicyclic and aromatic rings, polyether compounds, bisphenols and alkylene oxide adducts thereof, aromatic dihydroxy compounds and alkylene oxide adducts thereof, and the like.

Examples of the aliphatic diols include, but are not limited to, ethylene glycol, trimethylene glycol, 1,4-butanediol, 1,5-pentanediol, 1,6-hexanediol, diethylene glycol, propylene glycol, and neopentyl glycol.

Examples of the diols having alicyclic and aromatic rings include, but are not limited to, 1,3-cyclohexanedimethanol, 1,4-cyclohexanedimethanol, 1,2-decahydronaphthalenedimethanol, 1,3-decahydronaphthalenedimethanol, 1,4-decahydronaphthalenedimethanol, 1,5-decahydronaphthalenedimethanol, 1,6-decahydronaphthalenedimethanol, 2,6-decahydronaphthalenedimethanol, 2,7-decahydronaphthalenedimethanol, tetralindimethanol, spiroglycol, norbornanediol, and xylyleneglycol.

Examples of the polyether compounds include, but are not limited to, polyethylene glycol, polypropylene glycol, and polybutylene glycol.

Examples of the bisphenols include, but are not limited to, 4,4'-(1-methylethylidene)bisphenol, methylenebisphenol (bisphenol F), 4,4'-cyclohexylidene bisphenol (bisphenol Z), and 4,4'-sulfonylbisphenol (bisphenol S).

Examples of the aromatic dihydroxy compounds include, but are not limited to, hydroquinone, resorcin, 4,4'-dihydroxybiphenyl, 4,4'-dihydroxydiphenyl ether, and 4,4'-dihydroxydiphenylbenzophenone.

From the viewpoint of the mechanical strength and heat resistance of the polyester resin and the availability of the diol, units derived from ethylene glycol, trimethylene glycol, 1,4-butanediol, 1,4-cyclohexanedimethanol, and the like are preferable, and ethylene glycol and 1,4-cyclohexanedimethanol units are particularly preferable.

These further diol constitutional units may be contained singly or as a combination of two or more.

When contained in the polyester resin of the present embodiment, a constitutional unit derived from ethylene glycol is preferably 0 to 80 mol %, more preferably 0 to 79 mol %, and even more preferably 0 to 75 mol %, of the diol constitutional unit, from the viewpoint of heat resistance.

Examples of the dicarboxylic acid constitutional unit include, but are not particularly limited to, constitutional units derived from terephthalic acid, isophthalic acid, phthalic acid, 1,3-naphthalenedicarboxylic acid, 1,4-naphthalenedicarboxylic acid, 1,5-naphthalenedicarboxylic acid, 2,6-naphthalenedicarboxylic acid, 2,7-naphthalenedicarboxylic acid, 2-methylterephthalic acid, biphenyldicarboxylic acid, tetralindicarboxylic acid, succinic acid, glutaric acid, adipic acid, pimelic acid, suberic acid, azelaic acid, sebacic acid, decanedicarboxylic acid, dodecanedicarboxylic acid, cyclohexanedicarboxylic acid, decalindicarboxylic acid, norbornanedicarboxylic acid, tricyclodecanedicarboxylic acid, pentacyclododecanedicarboxylic acid, 3,9-bis(1,1-dimethyl-2-carboxyethyl)-2,4,8,10-tetraoxaspiro[5.5]undecane, 5-carboxy-5-ethyl-2-(1,1-dimethyl-2-carboxyethyl)-1,3-dioxane, dimer acid, and the like. From the viewpoint of the mechanical strength and heat resistance of the polyester resin, and availability of the dicarboxylic acid, constitutional units derived from at least one selected from terephthalic acid, isophthalic acid, 2,6-naphthalenedicarboxylic acid, and 1,4-cyclohexanedicarboxylic acid are preferable, and from the viewpoint of economy, constitutional units derived from terephthalic acid and isophthalic acid are particularly preferable. When a higher heat resistance is desired, it is particularly preferable to contain a constitutional unit derived from 2,6-naphthalenedicarboxylic acid. In the present embodiment, the dicarboxylic acid may be used in the form of an ester of a carboxylic acid and an alcohol having 1 to 6 carbon atoms.

These dicarboxylic acid constitutional units may be contained singly or as a combination of two or more. When a constitutional unit derived from 2,6-naphthalenedicarboxylic acid is contained in order to obtain a higher heat resistance, the proportion of the constitutional unit derived from 2,6-naphthalenedicarboxylic acid in the dicarboxylic acid constitutional unit is preferably 60 to 100 mol %, more preferably 80 to 100 mol %, and even more preferably 90 to 100 mol %.

The polyester resin of the present embodiment mainly contains a diol constitutional unit and a dicarboxylic acid constitutional unit and, in order to regulate the melt viscoelasticity, molecular weight, and the like, may contain a unit derived from a monoalcohol, a unit derived from a polyhydric alcohol having a valency of 3 or more, a unit derived from a monocarboxylic acid, a unit derived from a polycarboxylic acid, or a unit derived from an oxyacid as long as the object of the present embodiment is not impaired.

Examples of the monoalcohol include, but are not limited to, butyl alcohol, hexyl alcohol, and octyl alcohol. Examples of the polyhydric alcohol having a valency of 3 or more include, but are not limited to, trimethylolpropane, glycerin, 1,3,5-pentanetriol, and pentaerythritol. Examples of the monocarboxylic acid include, but are not limited to, benzoic acid, propionic acid, and butyric acid. Examples of the polycarboxylic acid include, but are not limited to, trimellitic acid, and pyromellitic acid. Examples of the oxyacid include, but are not limited to, glycolic acid, lactic acid, hydroxybutyric acid, 2-hydroxyisobutyric acid, and hydroxybenzoic acid.

The method for producing a polyester resin using a compound represented by general formula (i) is not particularly limited, and a conventionally known polyester production method is applicable. Examples thereof include melt polymerization methods such as an ester exchange method and a direct esterification method, or solution polymerization methods.

When producing the polyester resin of the present embodiment, an ester interchange catalyst, an esterification catalyst, a polycondensation catalyst, or the like that is used when producing an ordinary polyester resin can be used. These catalysts are not particularly limited, and examples include compounds of metals such as zinc, lead, cerium, cadmium, manganese, cobalt, lithium, sodium, potassium, calcium, nickel, magnesium, vanadium, aluminum, titanium, antimony, germanium, tin, and hafnium (for example, fatty acid salts, carbonic acid salts, phosphoric acid salts, hydroxides, chlorides, oxides, and alkoxides), and magnesium metal. These can be used singly or as a combination of two or more. Among the aforementioned catalysts, compounds of manganese, cobalt, zinc, titanium, calcium, antimony, germanium, and tin are preferable, and compounds of manganese, titanium, antimony, germanium, and tin are more preferable. The amount of these catalysts used is not particularly limited, and the amount in terms of metal component relative to the raw materials of the polyester resin is preferably 1 to 1000 ppm, more preferably 3 to 750 ppm, and even more preferably 5 to 500 ppm.

The reaction temperature in the polymerization reaction depends on the kind of the catalyst, the amount of the catalyst used, and the like. It is usually selected from the range of 150° C. to 300° C., and is preferably 180° C. to 280° C. in view of the reaction rate and the coloration of the resin. It is preferable to regulate the pressure in the reaction vessel eventually to 1 kPa or lower and, more preferably, eventually to 0.5 kPa or lower, from atmospheric pressure.

When performing the polymerization reaction, a phosphorus compound may be added as desired. Examples of the phosphorus compound include, but are not limited to, phosphoric acid, phosphorous acid, phosphoric acid esters, and phosphorous acid esters. Examples of phosphoric acid esters include, but are not limited to, methyl phosphate, ethyl phosphate, butyl phosphate, phenyl phosphate, dimethyl phosphate, diethyl phosphate, dibutyl phosphate, diphenyl phosphate, trimethyl phosphate, triethyl phosphate, tributyl phosphate, and triphenyl phosphate. Examples of phosphorous acid esters include, but are not limited to, methyl phosphite, ethyl phosphite, butyl phosphite, phenyl phosphite, dimethyl phosphite, diethyl phosphite, dibutyl phosphite, diphenyl phosphite, trimethyl phosphite, triethyl phosphite, tributyl phosphite, and triphenyl phosphite. These can be used singly or as a combination of two or more. The concentration of phosphorus atom in the polyester resin of the present embodiment is preferably 1 to 500 ppm, more preferably 3 to 400 ppm, and even more preferably 5 to 200 ppm. There is a tendency that a polyester resin having a good hue can be obtained and also a sufficient degree of polymerization can be reached by containing the phosphorus atom in the above range.

The phosphorus atom to be contained in the polyester resin of the present embodiment may be contained at any time during the production of the resin. The timing is not particularly limited, and the phosphorus atom can be contained in the polyester resin by adding a phosphorus compound to the reaction system, for example, at the time of charging raw materials, at the beginning of or during the course of an ester exchange or esterification reaction, or at the beginning of, during the course of, or at the end of a polycondensation reaction.

When producing the polyester resin of the present embodiment, various stabilizers such as etherification inhibitors, heat stabilizers, and light stabilizers, polymerization regulators, and the like can be used.

Various additives and molding aids can be added to the polyester resin of the present embodiment as long as the object of the present embodiment is not impaired, such as antioxidants, light stabilizers, UV absorbers, plasticizers, extenders, delustrants, drying regulators, antistatic agents, antisettling agents, surfactants, flowability improvers, drying oils, waxes, fillers, colorants, reinforcing agents, surface smoothing agents, leveling agents, curing reaction promoters, and thickeners.

The polyester resin of the present embodiment has a glass transition temperature of 90° C. or higher and an amount of heat of a crystallization exothermic peak in temperature drop of 5 J/g or less, as measured with a differential scanning calorimeter. The glass transition temperature is measured at a heating rate of 20° C./min, and the amount of heat of a crystallization exothermic peak in temperature drop is measured at a cooling rate of 5° C./min.

Due to the glass transition temperature being 90° C. or higher, the polyester resin of the present embodiment has higher heat resistance than PET. From the above viewpoint, the glass transition temperature is preferably 100° C. or higher, more preferably 120° C. or higher, and even more preferably 130° C. or higher. When a constitutional unit derived from 2,6-naphthalenedicarboxylic acid is contained as a dicarboxylic acid constitutional unit to obtain higher heat resistance, the glass transition temperature is preferably 130° C. or higher, and more preferably 140° C. or higher.

Due to the amount of heat of a crystallization exothermic peak in temperature drop being 5 J/g or less, the crystallinity of the polyester resin of the present embodiment is suppressed, and it is possible to suppress deterioration of transparency resulting from crystallization when forming a thick molded article. From the above viewpoint, the amount of heat of a crystallization exothermic peak in temperature drop is preferably 3 J/g or less, more preferably less than 1 J/g, even more preferably 0.01 J/g or less, and yet more preferably 0 J/g.

In the present embodiment, the method for adjusting the glass transition temperature of the polyester resin to be 90° C. or higher is not particularly limited, and, for example, the glass transition temperature can be regulated to the above range by suitably regulating the copolymerization ratio of raw-material monomers of the polyester resin.

The method for adjusting the amount of heat of a crystallization exothermic peak in temperature drop of the polyester resin to be 5 J/g or less is not particularly limited, and, for example, the amount of heat of a crystallization exothermic peak in temperature drop can be regulated to the above range by suitably regulating the copolymerization ratio of raw-material monomers of the polyester resin.

The YI value of the polyester resin of the present embodiment, as measured by performing a reflection method according to JIS K 7103 for pellets prepared therefrom, is 10 or less. Due to the YI value being 10 or less, the polyester resin of the present embodiment is a resin having a good hue. From the above viewpoint, the YI value is preferably 8 or less, and more preferably 5 or less.

In the present embodiment, the method for adjusting the YI value of the polyester resin to be 10 or less is not particularly limited, and, for example, the YI value can be regulated to the above range by suitably regulating the amount of the above-described phosphorous compound added.

The polyester resin of the present embodiment can be used in various applications. For example, it can be used in injection-molded articles, extruded articles such as sheets, films, and pipes, bottles, foams, tackifiers, adhesives, coating materials, and the like.

The sheets may be single-layered or multi-layered, the films also may be single-layered or multi-layered, and they may be unstretched, unidirectionally or bidirectionally stretched, or layered on a steel plate or the like. The bottles may be direct-blow bottles or injection-blow bottles, or may be injection-molded. The foams may be bead foams or extruded foams.

EXAMPLES

Below, the present embodiment will now be described in further detail by way of Examples, but the scope of the present embodiment is not limited to these Examples. Methods for evaluating the resins were as follows.
<Methods for Evaluating Polyester Resins>
(1) Resin Composition The proportions of the diol constitutional unit and the dicarboxylic acid constitutional unit in the polyester resin were calculated by 1H-NMR measurement. The measurement apparatus used was a nuclear magnetic resonator (manufactured by JEOL Ltd., product name: JNM-AL400), and measurement was carried out at 400 MHz. Deuterated chloroform was used as a solvent.
(2) Glass Transition Temperature (Tg)

As for the glass transition temperature of the polyester resin, a differential scanning calorimeter (manufactured by Shimadzu Corporation, trade name: DSC/TA-60WS) was used, about 10 mg of the polyester resin was placed in an unsealed aluminum container and heated to 280° C. at a heating rate of 20° C./min in a nitrogen gas stream (50 ml/min), and the dissolved polyester resin was rapidly cooled to give a measurement sample. The sample was measured under the same conditions, and the temperature which changes by only ½ of the difference in the baseline between the DSC curve before and that after transition was regarded as the glass transition temperature.
(3) Amount of Heat of a Crystallization Exothermic Peak in Temperature Drop (ΔHc)

The amount of heat of a crystallization exothermic peak in temperature drop of the polyester resin was calculated from the area of an exothermic peak appearing when the polyester resin was retained at 280° C. for 1 minute after measuring Tg and then cooled at a cooling rate of 5° C./min.
(4) YI Value The YI value of the polyester resin was evaluated for pellets prepared therefrom by a reflection method according to JIS K 7103. Measurement was carried out using a color difference meter (manufactured by Nippon Denshoku Industries Co., Ltd., product name: Color Meter ZE-2000).

Examples 1 to 4

The raw-material monomers indicated in Table 1 and tetra-n-butyl titanate as an ester exchange catalyst were charged into a 200 mL polyester production apparatus equipped with a partial condenser, a total condenser, a cold trap, a stirrer, a heater, and a nitrogen inlet tube, and heated to 230° C. to carry out an ester exchange reaction. After the reaction conversion ratio of the dicarboxylic acid component reached 90% or more, triethyl phosphate in an amount indicated in Table 1 was added to the dicarboxylic acid component, heating and depressurization were gradually carried out, and eventually polycondensation was carried out at 265° C. at 0.1 kPa or lower. The reaction was terminated when an appropriate melt viscosity was reached, and each polyester resin was thus produced. The evaluation results of the obtained polyester resins are shown in Table 1.

Examples 5 and 6

The raw-material monomers indicated in Table 1 and tetra-n-butyl titanate, which is an ester exchange catalyst, were charged into a 200 mL polyester production apparatus equipped with a partial condenser, a total condenser, a cold trap, a stirrer, a heater, and a nitrogen inlet tube, and heated to 225° C. in a nitrogen atmosphere to carry out an ester exchange reaction. After the reaction conversion ratio of the dicarboxylic acid component reached 90% or more, triethyl phosphate in an amount indicated in Table 1 was added, heating and depressurization were gradually carried out, and eventually polycondensation was carried out at 280° C. at 0.1 kPa or lower. The reaction was terminated when an appropriate melt viscosity was reached, and each polyester resin was thus produced. The evaluation results of the obtained polyester resins are shown in Table 1.

Examples 7 and 8

The raw-material monomers indicated in Table 1 was charged into a 200 mL polyester production apparatus equipped with a partial condenser, a total condenser, a cold trap, a stirrer, a heater, and a nitrogen inlet tube, and heated to 250° C. in a nitrogen atmosphere to carry out an esterification reaction. After the reaction conversion ratio of the dicarboxylic acid component reached 90% or more, tetra-n-butyl titanate and triethyl phosphate in amounts indicated in Table 1 were added to the dicarboxylic acid component, heating and depressurization were gradually carried out, and eventually polycondensation was carried out at 265° C. at 0.1 kPa or lower. The reaction was terminated when an appropriate melt viscosity was reached, and each polyester resin was thus produced. The evaluation results of the obtained polyester resins are shown in Table 1.

Comparative Examples 1 to 6

The raw-material monomers indicated in Table 2 and tetra-n-butyl titanate, which is an ester exchange catalyst, were charged into a 200 mL polyester production apparatus equipped with a partial condenser, a total condenser, a cold trap, a stirrer, a heater, and a nitrogen inlet tube, and heated to 225° C. in a nitrogen atmosphere to carry out an ester exchange reaction. After the reaction conversion ratio of the dicarboxylic acid component reached 900 or more, triethyl phosphate in an amount indicated in Table 2 was added, heating and depressurization were gradually carried out, and eventually polycondensation was carried out at 280° C. at 0.1 kPa or lower. The reaction was terminated when an appropriate melt viscosity was reached, and each polyester resin was thus produced. The evaluation results of the obtained polyester resins are shown in Table 2.

The abbreviations in the tables have the following meanings.
DMT: Dimethyl terephthalate
NDCM: Dimethyl 2,6-naphthalenedicarboxylate
CHDA: 1,4-Cyclohexanedicarboxylic acid
EG: Ethylene glycol
CHDM: 1,4-Cyclohexanedimethanol
D-NDM: Decahydro-1,4:5,8-dimethanonaphthalene-2,6(7)-dimethanol
2,3-D-NDM: Decahydro-1,4:5,8-dimethanonaphthalene-2,3-dimethanol
TBT: Tetra-n-butyl titanate
TEP: Triethyl phosphate

TABLE 1

| | | Example 1 | Example 2 | Example 3 | Example 4 | Example 5 | Example 6 | Example 7 | Example 8 |
|---|---|---|---|---|---|---|---|---|---|
| Synthesis of polyester resin Amount of monomer charged ($\times 10^{-3}$ mol) | | | | | | | | | |
| Dicarboxylic acid | DMT | 193.77 | 187.3 | 165.26 | 144.06 | | | | |
| | NDCM | | | | | 159.41 | 139.59 | | |
| | CHDA | | | | | | | 122.54 | 111.58 |
| Diol | D-NDM | 48.44 | 56.19 | 82.63 | 108.05 | 39.85 | 69.8 | 98.03 | 111.58 |
| | EG | 300.34 | 280.96 | 214.83 | 151.26 | 247.08 | 181.47 | 55.14 | 27.9 |
| Amount of catalyst and additive charged ($\times 10^{-6}$ mol) | | | | | | | | | |
| TBT | | 28.2 | 28.2 | 28.2 | 28.2 | 28.2 | 28.2 | 33.42 | 33.42 |
| TEP | | 43.59 | 43.59 | 43.59 | 43.59 | 43.59 | 43.59 | 51.66 | 51.66 |
| Evaluation result (polyester resin) | | | | | | | | | |
| Copolymer composition (mol %) | DMT | 100 | 100 | 100 | 100 | | | | |
| | NDCM | | | | | 100 | 100 | | |
| | CHDA | | | | | | | 100 | 100 |
| | D-NDM | 22.2 | 29.6 | 48 | 74 | 23.4 | 47.7 | 77.4 | 95.1 |
| | EG | 77.8 | 70.4 | 52 | 26 | 76.6 | 52.3 | 22.6 | 4.9 |
| Glass transition temperature (Tg) (° C.) | | 101.2 | 110 | 125 | 147 | 141 | 164 | 108.3 | 123 |
| Amount of heat of a crystallization exothermic peak in temperature drop ($\Delta$Hc) (J/g) | | 0 | 0 | 0 | 0 | 0 | 0 | 0 | 0 |
| YI value | | 3 | 3 | 2 | 2 | 2 | 2 | 2 | 2 |

TABLE 2

| | | Comparative Example 1 | Comparative Example 2 | Comparative Example 3 | Comparative Example 4 | Comparative Example 5 |
|---|---|---|---|---|---|---|
| Synthesis of polyester resin Amount of monomer charged ($\times 10^{-3}$ mol) | | | | | | |
| | DMT | 234.16 | 207.55 | | 230.32 | 187.3 |
| | NDCM | | | 185.77 | | |
| | CHDM | | 62.26 | | | |
| | EG | 421.5 | 311.32 | 334.39 | 409.98 | 280.96 |
| | D-NDM | | | | 4.61 | |
| | 2,3-D-NDM | | | | | 56.19 |
| Amount of catalyst and additive charged ($\times 10^{-6}$ mol) | | | | | | |
| TBT | | 28.2 | 28.2 | 28.2 | 28.2 | 28.2 |
| TEP | | 43.59 | 43.59 | 43.59 | 43.59 | 43.59 |
| Evaluation result (polyester resin) | | | | | | |
| Copolymer composition (mol %) | DMT | 100 | 100 | | 100 | 100 |
| | EG | 100 | 67.4 | 100 | 98.1 | 70.5 |
| | NDCM | | | 100 | | |
| | CHDM | | 32.6 | | | |
| | D-NDM | | | | 1.9 | |
| | 2,3-D-NDM | | | | | 29.5 |
| Glass transition temperature (Tg) (° C.) | | 82 | 83 | 118 | 84 | 94 |
| Amount of heat of a crystallization exothermic peak in temperature drop ($\Delta$Hc) (J/g) | | 20 | 0 | 5.5 | 19 | 0 |
| YI value | | 2 | 2 | 2 | 2 | 2 |

The present application is based on a Japanese Patent Application (Japanese Patent Application No. 2015-184687) filed with Japan Patent Office on Sep. 18, 2015, and the entire contents of which are hereby incorporated by reference.

INDUSTRIAL APPLICABILITY

The polyester resin of the present invention has excellent transparency, heat resistance and heat stability, and has a good resin hue. The use of the polyester resin of the present invention makes it possible to produce thick molded articles having excellent transparency, heat resistance and heat resistance, and therefore the industrial significance of the present invention is considerable.

The invention claimed is:

1. A polyester resin comprising a diol constitutional unit and a dicarboxylic acid constitutional unit, wherein:
   74 to 100 mol % of the diol constitutional unit is a constitutional unit derived from a diol having a dinorbornane ring represented by the following formula (i);
   a glass transition temperature is 90° C. or higher;
   an amount of heat of a crystallization exothermic peak in temperature drop is less than 1 J/g; and
   a yellow index (YI) value as measured by a reflection method according to JIS K 7103 is 10 or less:

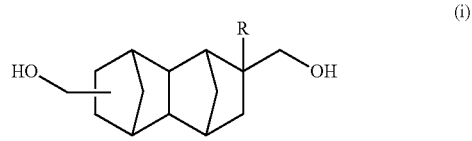

(i)

wherein R is H, CH$_3$, or C$_2$H$_5$, wherein the polyester resin further comprises at least one of phosphoric acid, phosphorous acid, phosphoric acid esters, and phosphorous acid esters.

2. The polyester resin according to claim 1, wherein the dicarboxylic acid constitutional unit is a constitutional unit derived from at least one selected from terephthalic acid, isophthalic acid, 2,6-naphthalenedicarboxylic acid, and 1,4-cyclohexanedicarboxylic acid.

3. The polyester resin according to claim 1, comprising a constitutional unit derived from 2,6-naphthalenedicarboxylic acid as the dicarboxylic acid constitutional unit, wherein the glass transition temperature is 130° C. or higher.

4. The polyester resin according to claim 1, comprising a constitutional unit derived from ethylene glycol as a diol constitutional unit other than the diol having a dinorbornane ring represented by formula (i).

5. The polyester resin according to claim 1, further comprising at least one of a unit derived from a monoalcohol, a unit derived from a polyhydric alcohol having 3 or more hydroxyl groups, a unit derived from a monocarboxylic acid, a unit derived from a polycarboxylic acid having 3 or more carboxyl groups, and a unit derived from an oxyacid.

* * * * *

UNITED STATES PATENT AND TRADEMARK OFFICE
CERTIFICATE OF CORRECTION

PATENT NO.        : 10,889,684 B2
APPLICATION NO.   : 15/758592
DATED             : January 12, 2021
INVENTOR(S)       : Y. Satake et al.

Page 1 of 1

It is certified that error appears in the above-identified patent and that said Letters Patent is hereby corrected as shown below:

At Column 11, Line 27 (Claim 1, Line 12), please change "$C_2H_5$," to -- $C_2H_5$; --.

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*